United States Patent
Bian et al.

(10) Patent No.: US 8,780,888 B2
(45) Date of Patent: Jul. 15, 2014

(54) FACILITATING NON-SIP USERS CALLING SIP USERS

(75) Inventors: Michael Jianjun Bian, Shandong (CN); Hao Lei Ren, Shandong (CN); Aden Bin Yang, Shandong (CN)

(73) Assignee: Alcatel Lucent, Paris (FR)

( * ) Notice: Subject to any disclaimer, the term of this patent is extended or adjusted under 35 U.S.C. 154(b) by 1747 days.

(21) Appl. No.: 11/946,984

(22) Filed: Nov. 29, 2007

(65) Prior Publication Data

US 2009/0003321 A1 Jan. 1, 2009

(30) Foreign Application Priority Data

Jun. 29, 2007 (CN) .......................... 2007 1 0152735

(51) Int. Cl.
*H04L 12/66* (2006.01)
*H04M 3/42* (2006.01)
*H04M 7/00* (2006.01)

(52) U.S. Cl.
USPC ................ 370/352; 379/216.01; 379/219

(58) Field of Classification Search
USPC ................ 370/352; 379/216.01, 219–221.02
See application file for complete search history.

(56) References Cited

U.S. PATENT DOCUMENTS

| 7,450,565 | B2  |   | 11/2008 | Suotula et al. |
|-----------|-----|---|---------|----------------|
| 8,085,922 | B1  | * | 12/2011 | Smith et al. ............. 379/216.01 |
| 2002/0024943 | A1 | * | 2/2002 | Karaul et al. .................. 370/338 |
| 2006/0034270 | A1 | * | 2/2006 | Haase et al. .................. 370/389 |
| 2007/0121608 | A1 | * | 5/2007 | Gu et al. ........................ 370/356 |
| 2007/0121884 | A1 | * | 5/2007 | Sin et al. ....................... 379/219 |
| 2008/0270611 | A1 | * | 10/2008 | Noldus et al. ................. 709/227 |

OTHER PUBLICATIONS

Johnson et al., Transporting User to User Information for Call Centers using SIP, Dec. 27, 2006, IETF, draft-johnston-sipping-cc-uui-01.*

* cited by examiner

*Primary Examiner* — Nicholas Jensen
(74) *Attorney, Agent, or Firm* — Carlson, Gaskey & Olds

(57) ABSTRACT

A technique for allowing a non-SIP user to call a SIP user includes dialing an established service number that indicates a desire to place a call to a SIP user. The SIP URI of the intended call recipient is included in a call setup protocol message associated with dialing the service number. A non-SIP network recognizes the call to the service number and the SIP URI from the UUI parameter of the call setup message. The call is then routed to a gateway for interfacing between the non-SIP network and the appropriate SIP network where the SIP URI is extracted from the message received by the gateway and used to generate an SIP INVITE message for establishing the call with the intended SIP user.

20 Claims, 2 Drawing Sheets

US 8,780,888 B2

FACILITATING NON-SIP USERS CALLING SIP USERS

CROSS REFERENCE TO RELATED APPLICATIONS

This application claims priority to Chinese Patent Application No. 200710152735.6, which was filed on Jun. 29, 2007.

FIELD OF THE INVENTION

This invention generally relates to communication. More particularly, this invention relates to facilitating communication between users of different protocols.

DESCRIPTION OF THE RELATED ART

Various communication systems are well known. Line-based telephone systems have been in use for many years. More recently, wireless telephone communications have become increasingly popular. Various protocols for wireless communications have been introduced. For example, there are circuit switch based protocols, packet based protocols and voice over Internet protocol techniques currently in use. One protocol that has been gaining popularity for voiceover internet protocol communications includes the session initiation protocol (SIP). In addition to internet telephony, SIP is an application layer control protocol that can be used for various multi-media sessions or calls.

Communications between users on an SIP network can occur by utilizing the uniform resource identifier (URI) assigned to a particular user. For example, an SIP URI may be of the format tom@skype.com. Communications between SIP users occur in a known manner.

A complication exists when a non-SIP user intends to call an SIP user. Some accommodation must be provided to interface between the non-SIP user and the SIP user because the SIP URI is not a telephone number that can be dialed like a mobile cell phone number. One difficulty associated with previous proposals to address this situation is that they require additional hardware to be added to a network and additional messaging to be exchanged between a calling party and the network so that the calling party can eventually provide sufficient information to have their call routed to the intended SIP user. There is a need for a procedure to allow a non-SIP user to call a SIP user in a convenient and network-efficient manner. This invention addresses that need.

SUMMARY

An exemplary method of communicating includes determining if a caller has dialed a service number for making a call to a session initiation protocol (SIP) user from a non-SIP device. A SIP uniform resource identifier (URI) of the SIP user is determined from a user-to-user-information parameter in a call setup protocol message associated with the caller dialing the service number. A SIP INVITE message is generated including the determined SIP URI. The call is established between the caller and the SIP user based on the SIP INVITE message.

An exemplary method of placing a call to a SIP user from a non-SIP device includes calling an established service number that indicates a desire to contact a SIP user from a non-SIP device. A SIP URI is included in a user-to-user-information parameter of a call setup message associated with the calling of the service number. A non-SIP network can receive the called service number and can communicate the SIP URI to a SIP network accessed by the SIP user.

The various features and advantages of this invention will become apparent to those skilled in the art from the following detailed description. The drawings that accompany the detailed description can be briefly described as follows.

DETAILED DESCRIPTION

A disclosed example embodiment facilitates a non-session initiation protocol (SIP) user calling a SIP user based upon a SIP uniform resource identifier (URI) of the SIP user. The illustrated example allows for utilizing the user-to-user-information parameter in a call setup protocol message to transfer the SIP URI from the non-SIP user to an appropriate portion of an SIP network for establishing the intended call.

Figure 1:
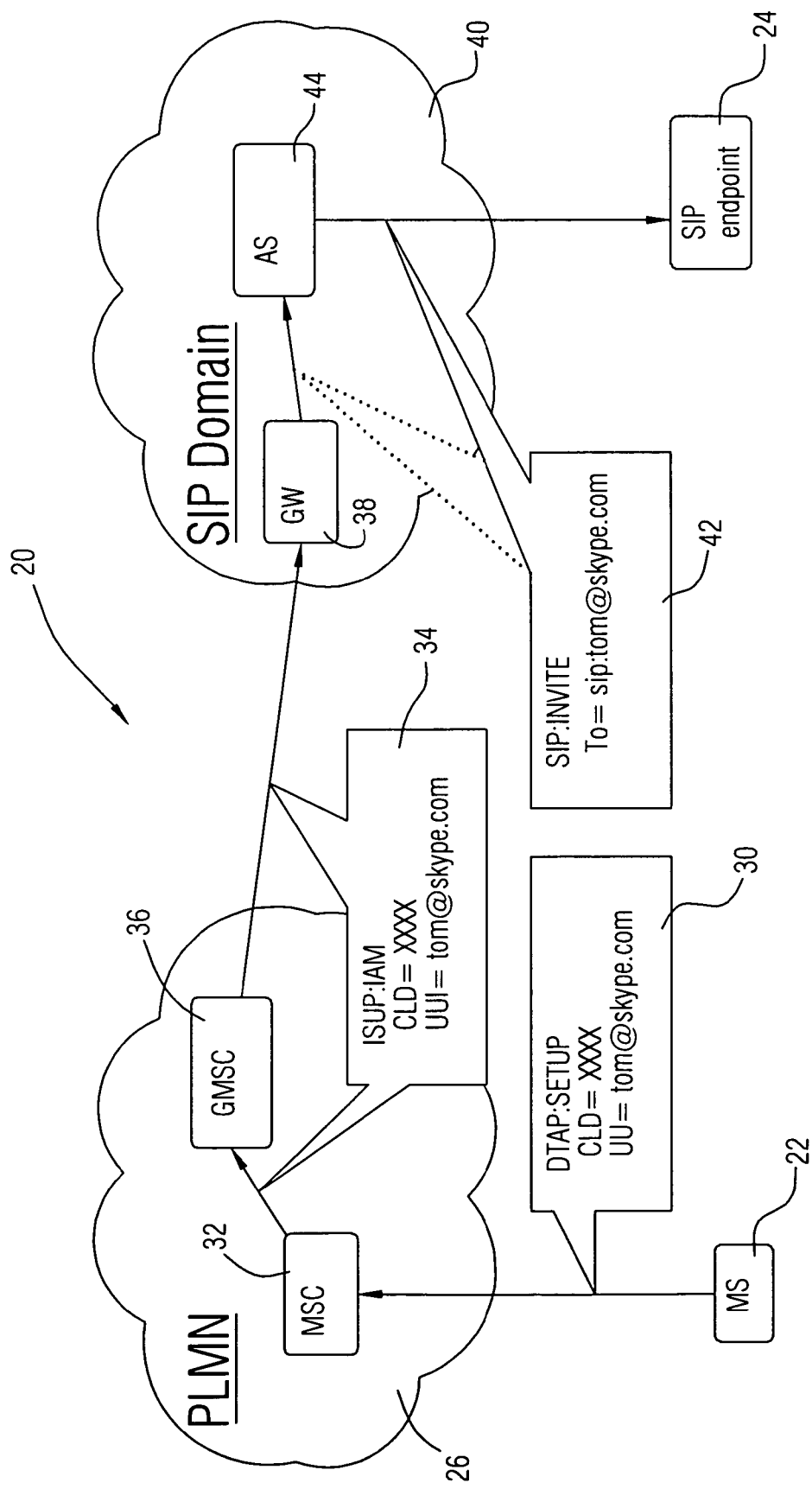
FIG. 1 schematically illustrates selected portions of a communication arrangement that is useful with an embodiment of this invention.

FIG. 1 schematically shows selected portions of a communication system 20. In this example, a user of a non-SIP device 22, which is a mobile station in one example, intends to call a user of another device 24, which is a SIP endpoint in one example. The non-SIP device 22 in this example is a mobile station, which is non-SIP device because it operates based upon another communication protocol other than SIP. The SIP device 24, on the other hand, utilizes SIP and, therefore, can be referred to as an SIP device for purposes of discussion. Neither of the example devices 22 or 24 are necessarily limited to communication using a single protocol, exclusively. The device 22 uses any ISDN-like protocol that includes user-to-user information in a call set up message. The device 24 uses any SIP protocol.

When a user of the mobile station 22 intends to call a user of the SIP device 24, the mobile station 22 is used to place a call to a network 26 such as a public land mobile network (PLMN) that utilizes one of several known communication protocols. The user causes the mobile station 22 to dial a service number that has been established by a network operator or service provider as a dedicated service number used for indicating when a call to an SIP user is desired. As schematically shown at 30, a call setup protocol message associated with calling the service number includes the service number (e.g., XXXX) as the indicated called number and the user-to-user information (UUI) parameter is set to the SIP uniform resource identifier (URI) of the intended call recipient. The mobile station 22 is suitably programmed to include the SIP URI of the intended recipient (e.g., the SIP user the caller desires to contact) into the appropriate portion of the call setup protocol message. Given this description, those skilled in the art will realize how to program a non-SIP device to accomplish this in a manner that meets the needs of their particular implementation.

A call is received by a mobile switching center (MSC) 32 of the network 26. Upon determining that the service number has been called, the MSC 32 sends an integrated services digital network user part (ISUP) message 34 to a gateway 36 of the network 26 for routing the call to a gateway 38 of an appropriate SIP network 40. The same ISUP message 34 is transferred between the gateway 36 and the gateway 38 in the illustrated example.

The gateway 38 of the SIP network 40 determines the SIP URI of the intended call recipient and converts the ISUP message to a SIP message that is a SIP INVITE message including the SIP URI. The SIP INVITE message is used to bring the device 24 into the call in a manner that is consistent with existing SIP protocol. The SIP INVITE message is provided by an application server 44 to the device 24 to establish the call between the devices 22 and 24.

In one example, the gateway 38 converts the incoming ISUP message to the SIP message in the same way that it would for another non-SIP mobile originated call to an SIP user. In this example, the "To" header of the SIP INVITE message includes the SIP URI provided when the mobile station 22 placed the initial call received by the non-SIP network 26.

Figure 2:
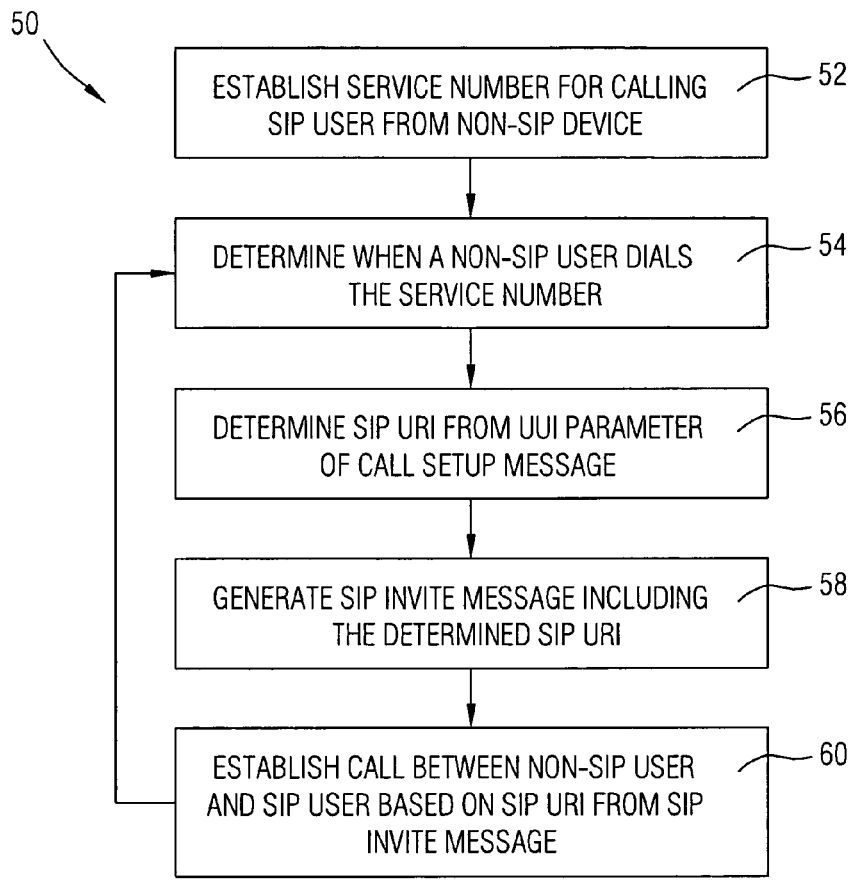
FIG. 2 is a flowchart diagram summarizing one example approach.

FIG. 2 includes a flowchart diagram 50 summarizing an example approach from a provider or a network standpoint. At 52, a service number is established for allowing non-SIP users to indicate a desire to call a SIP user from a non-SIP device. At 54, a determination is made when a non-SIP user dials the service number. At 56, the SIP URI of the intended call recipient is determined from the UUI parameter of the call setup message associated with the call to the service number. Based on the determination that the service number was dialed, the call is routed to the gateway between the network receiving the call and an appropriate SIP network. In one example, it is the gateway that determines the SIP URI from the UUI parameter of the call setup message at 56. In another example, an application service of the SIP network makes the determination regarding the actual SIP URI of the intended call recipient.

At 58, an SIP INVITE message is generated including the determined SIP URI. At 60, the call is established between the non-SIP user and the SIP user based upon the SIP URI from the SIP INVITE message.

In one example, the SIP INVITE message is arranged by including the SIP URI of the intended call recipient in the "To" header of the SIP INVITE message. In one example, the SIP URI from the UUI is mapped to the SIP message header. In another example, the SIP URI from the UUI is encapsulated in the SIP message body. The choice of how to include the SIP URI in the SIP message will depend on how the particular gateway is configured to support ISUP-SIP interworking. Once the SIP message is routed from the gateway to the application server, the application server can retrieve the UUI information from the SIP message and proceed to establish the call with the appropriate device 24.

Figure 3:
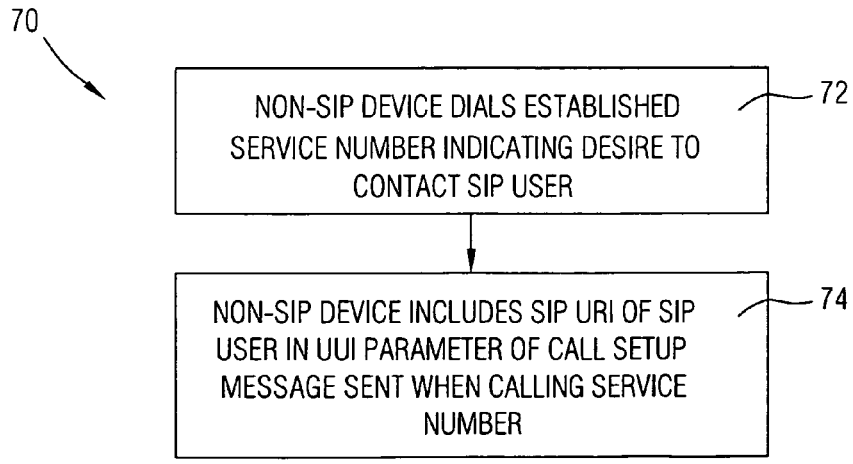
FIG. 3 is a flowchart diagram summarizing another example approach.

FIG. 3 includes a flowchart diagram 70 summarizing an example approach from a mobile station or caller standpoint. At 72, a non-SIP device dials the established service number indicating the desire to contact an SIP user. At 74, the non-SIP device includes the SIP URI of the SIP user in the UUI parameter of the call setup message that is sent when calling the service number. In one example, a mobile station is configured to allow a menu selection for calling a SIP user that automatically dials the service number. In other words, the user of the mobile station need not manually dial the service number each time a call to an SIP user is required. Instead, the user may be presented with a menu selection for placing an SIP call that allows the user to make an appropriate menu selection to cause the mobile station to automatically dial the service number and incorporate the SIP URI in the appropriate portion (e.g., UUI) of the call setup message that is associated with dialing the service number.

The SIP URIs of known SIP users are stored in a memory of a mobile device in one example. In such a case, the menu selection for dialing the service number results in a prompt to enter the SIP URI manually or by choosing a prestored SIP URI from the memory. In another example, the user selects or enters the SIP URI before initiating a call to the service number.

One feature of the disclosed example is that it allows for a non-SIP device to place a call to a SIP device utilizing the SIP URI of the intended call recipient. No additional hardware is required in the mobile station or in the network because existing fields of a call setup message (e.g., the UUI) can be used to provide the information necessary for placing the call. The user of the mobile station only needs to know the SIP URI of the intended call recipient and there is no need for generating additional call codes that have to be mapped to that particular URI within the mobile station or in the network. Additionally, the disclosed example takes advantage of existing fields within messages that have a format already recognized within existing networks but uses them in a new way for establishing the non-SIP user to SIP user call. Given this description, those skilled in the art will realize how to suitably program a mobile station and network elements, such as mobile switching center and gateway components, for making the determinations and generating the messages described above for realizing the results provided by the illustrated example embodiment.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method of communicating, comprising:
   determining if a caller has dialed a service number for making a call to a session initiation protocol (SIP) user from a non-SIP mobile station device, wherein the service number is dedicated to indicating when a call to a SIP device is desired;
   determining a SIP uniform resource identifier (URI) of the SIP user from a user-to-user-information parameter in a direct transfer application part (DTAP) call setup protocol message associated with the caller dialing the service number;
   generating an SIP INVITE message including the determined SIP UM; and
   establishing a call between the caller and the SIP user based on the SIP INVITE message.

2. The method of claim 1, comprising
   receiving the dialed service number from the non-SIP device at a mobile switching center of a non-SIP network;
   routing the call to a gateway configured to interface between the non-SIP network and a SIP network.

3. The method of claim 2, comprising
   sending a integrated services digital network user part (ISUP) message from the mobile switching center to the gateway;
   converting the ISUP message to a SIP message to generate the SIP INVITE message.

4. The method of claim 3, comprising
   mapping the determined SIP URI to a header of the SIP message.

5. The method of claim 3, comprising
   including the determined SIP URI in a body of the SIP message.

6. The method of claim 3, comprising
routing the SIP message to an application server of the SIP network.

7. The method of claim 1, comprising
establishing a dedicated number as the service number.

8. A method of placing a call to a session initiation protocol (SIP) user from a non-SIP mobile station device, comprising
calling an established service number that indicates a desire to contact a SIP user from a non-SIP device, wherein the service number is dedicated to indicating when a call to a SIP device is desired;
including a SIP uniform resource identifier (URI) in a user-to-user-information parameter of a direct transfer application part (DTAP) call setup message associated with the calling of the service number such that a non-SIP network receiving the called service number can communicate the SIP URI to a SIP network accessed by the SIP user.

9. The method of claim 8, comprising
storing at least one SIP URI in a memory of the non-SIP device;
selecting the stored SIP URI of the SIP user from the memory for inclusion in the user-to-user-information parameter.

10. The method of claim 9, comprising
automatically dialing the service number responsive to a corresponding selection by a user of the non-SIP device; and
automatically placing the selected SIP URI in the user-to-user-information parameter of the call setup message sent when automatically dialing the service number.

11. The method of claim 9, wherein the service number is distinct from any user number.

12. The method of claim 1, wherein the service number is distinct from any user number.

13. A non-session initiation protocol (non-SIP) mobile station device, comprising
a calling portion configured to call an established service number that indicates a desire to contact a session initiation protocol (SIP) user from the non-SIP mobile station device, wherein the service number is dedicated to indicating when a call to a SIP device is desired; and
a processor configured to include a SIP uniform resource identifier (URI) in a user-to-user-information parameter of a direct transfer application part (DTAP) call setup message associated with the calling of the service number such that a non-SIP network receiving the called service number can communicate the SIP URI to a SIP network accessed by the SIP user.

14. The device of claim 13, comprising a memory storing at least one SIP URI and wherein the processor is configured to select the stored SIP URI of the SIP user from the memory for inclusion in the user-to-user-information parameter.

15. The device of claim 13, wherein the processor is configured to
automatically dial the service number responsive to a corresponding selection by a user of the non-SIP device; and
automatically place the selected SIP URI in the user-to-user-information parameter of the call setup message sent when automatically dialing the service number.

16. The device of claim 13, wherein the service number is distinct from any user number.

17. A communication network device, comprising:
at least one processor configured to determine if a caller has dialed a service number for making a call to a session initiation protocol (SIP) user from a non-SIP mobile station device, wherein the service number is dedicated to indicating when a call to a SIP device is desired;
determine a SIP uniform resource identifier (URI) of the SIP user from a user-to-user-information parameter in a direct transfer application part (DTAP) call setup protocol message associated with the caller dialing the service number;
generate an SIP INVITE message including the determined SIP URI; and
facilitate establishing a call between the caller and the SIP user based on the SIP INVITE message.

18. The device of claim 17, wherein the network device comprises a mobile switching center of a non-SIP network.

19. The device of claim 17, wherein the network device comprises a gateway configured to interface between a non-SIP network and a SIP network.

20. The device of claim 17, wherein the service number is distinct from any user number.

* * * * *